(12) United States Patent
Fujiwara

(10) Patent No.: US 12,010,418 B2
(45) Date of Patent: Jun. 11, 2024

(54) SOLID-STATE IMAGING ELEMENT, SIGNAL PROCESSING METHOD THEREOF, AND ELECTRONIC DEVICE

(71) Applicant: SONY GROUP CORPORATION, Tokyo (JP)

(72) Inventor: Tatsuo Fujiwara, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 339 days.

(21) Appl. No.: 17/417,899

(22) PCT Filed: Dec. 25, 2019

(86) PCT No.: PCT/JP2019/050769
§ 371 (c)(1),
(2) Date: Jun. 24, 2021

(87) PCT Pub. No.: WO2020/145142
PCT Pub. Date: Jul. 16, 2020

(65) Prior Publication Data
US 2022/0094842 A1 Mar. 24, 2022

(30) Foreign Application Priority Data
Jan. 8, 2019 (JP) ................................. 2019-000986

(51) Int. Cl.
*H04N 23/61* (2023.01)
*G06N 3/04* (2023.01)

(52) U.S. Cl.
CPC ............... *H04N 23/61* (2023.01); *G06N 3/04* (2013.01)

(58) Field of Classification Search
CPC ........ H04N 23/61; H04N 23/80; H04N 25/75; H04N 25/77; G06N 3/04; G06N 3/045; G06N 3/063; G06F 17/10
See application file for complete search history.

(56) References Cited

U.S. PATENT DOCUMENTS 10,453,220 B1 * 10/2019 Mihal ...................... G06N 3/04
2013/0271633 A1 * 10/2013 Hashimoto ............ H04N 25/60
348/300

(Continued)

FOREIGN PATENT DOCUMENTS

CN 108781265 A 11/2018
CN 109344738 A 2/2019

(Continued)

OTHER PUBLICATIONS

Bong, et al., "A Low-Power Convolutional Neural Network Face Recognition Processor and a CIS Integrated With Always-on Face Detector", IEEE Journal of Solid-State Circuits, Dec. 13, 2017, vol. 1, 53, No. 1, pp. 115-123 (9 pages).

(Continued)

*Primary Examiner* — Christopher K Peterson
(74) *Attorney, Agent, or Firm* — CHIP LAW GROUP

(57) ABSTRACT

The present technology relates to a solid-state imaging element, a signal processing method thereof, and an electronic device capable of suppressing a bus band and power consumption required for reading a pixel signal from the solid-state imaging element.

The solid-state imaging element performs calculation of at least one stage of a convolutional layer and a pooling layer in a convolutional neural network on a signal corresponding to a light reception amount of light incident on each pixel of a pixel array unit. The present technology can be applied to, for example, a solid-state imaging element and the like generating a captured image or a depth image.

7 Claims, 13 Drawing Sheets

(56) References Cited

U.S. PATENT DOCUMENTS

| | | | |
|---|---|---|---|
| 2019/0034748 A1 | 1/2019 | Matsumoto et al. | |
| 2019/0130292 A1* | 5/2019 | N | G06N 5/047 |
| 2019/0204448 A1 | 7/2019 | Eki | |
| 2019/0205780 A1 | 7/2019 | Sakaguchi | |
| 2020/0285954 A1* | 9/2020 | Li | G06N 3/063 |

FOREIGN PATENT DOCUMENTS

| | | |
|---|---|---|
| CN | 109691079 A | 4/2019 |
| EP | 3439233 A1 | 2/2019 |
| EP | 3515057 A1 | 7/2019 |
| JP | 2018-067154 A | 4/2018 |
| JP | 2018-207273 A | 12/2018 |
| KR | 10-2019-0051963 A | 5/2019 |
| WO | 2017/168665 A1 | 10/2017 |
| WO | 2018/051809 A1 | 3/2018 |
| WO | 2018/074012 A1 | 4/2018 |

OTHER PUBLICATIONS

International Search Report and Written Opinion of PCT Application No. PCT/JP2019/050769, dated Mar. 17, 2020, 12 pages of ISRWO.

Fukui, et al., "Cloud-based face recognition system using privacy-conscious Deep Convolutional Neural Networks", The 22nd Symposium on Sensing via Image Information, Jul. 11, 2016.

* cited by examiner

SOLID-STATE IMAGING ELEMENT, SIGNAL PROCESSING METHOD THEREOF, AND ELECTRONIC DEVICE

CROSS REFERENCE TO RELATED APPLICATIONS

This application is a U.S. National Phase of International Patent Application No. PCT/JP2019/050769 filed on Dec. 25, 2019, which claims priority benefit of Japanese Patent Application No. JP 2019-000986 filed in the Japan Patent Office on Jan. 8, 2019. Each of the above-referenced applications is hereby incorporated herein by reference in its entirety.

TECHNICAL FIELD

The present technology relates to a solid-state imaging element, a signal processing method thereof, and an electronic device, and in particular to a solid-state imaging element, a signal processing method thereof, and an electronic device capable of suppressing a bus band and power consumption required for reading a pixel signal from the solid-state imaging element.

BACKGROUND ART

It is known that a convolutional neural network (hereinafter referred to as CNN) is useful for machine learning of an image. The CNN has a plurality of layers of convolutional layers and pooling layers, and is generally subjected to calculation processing by an image processing device (see, for example, Patent Document 1).

CITATION LIST

Patent Document

Patent Document 1: Japanese Patent Application Laid-Open No. 2018-67154

SUMMARY OF THE INVENTION

Problems to be Solved by the Invention

In recent years, resolution of an image sensor has been increasing. In a case where calculation processing of a CNN is applied to a high-resolution image, the number of calculations such as a sum of products and the like also increases in proportion to the number of pixels to be processed, and a processing load and power consumption increase. Furthermore, as the resolution of the image sensor is increased, a bus band and power consumption required for reading a pixel signal from the image sensor are also increased.

The present technology has been made in view of such a situation, and makes it possible to suppress a bus band and power consumption required for reading a pixel signal from a solid-state imaging element.

Solutions to Problems

A solid-state imaging element in a first aspect of the present technology is a solid-state imaging element including: a calculation unit that performs calculation of at least one stage of a convolutional layer and a pooling layer in a convolutional neural network on a signal corresponding to a light reception amount of light incident on each pixel of a pixel array unit.

A signal processing method of a solid-state imaging element in a second aspect of the present technology is a signal processing method of a solid-state imaging element, the method including: by the solid-state imaging element, performing calculation of at least one stage of a convolutional layer and a pooling layer in a convolutional neural network on a signal corresponding to a light reception amount of light incident on each pixel of a pixel array unit, and outputting a pixel signal after the calculation.

An electronic device in a third aspect of the present technology is an electronic device including: a solid-state imaging element including a calculation unit that performs calculation of at least one stage of a convolutional layer and a pooling layer in a convolutional neural network on a signal corresponding to a light reception amount of light incident on each pixel of a pixel array unit.

In the first to third aspects of the present technology, the calculation of at least one stage of the convolutional layer and the pooling layer in the convolutional neural network is performed on the signal corresponding to the light reception amount of light incident on each pixel of the pixel array unit by the solid-state imaging element.

Each of the solid-state imaging element and the electronic device may be an independent device or a module incorporated in another device.

MODE FOR CARRYING OUT THE INVENTION

Figure 1:
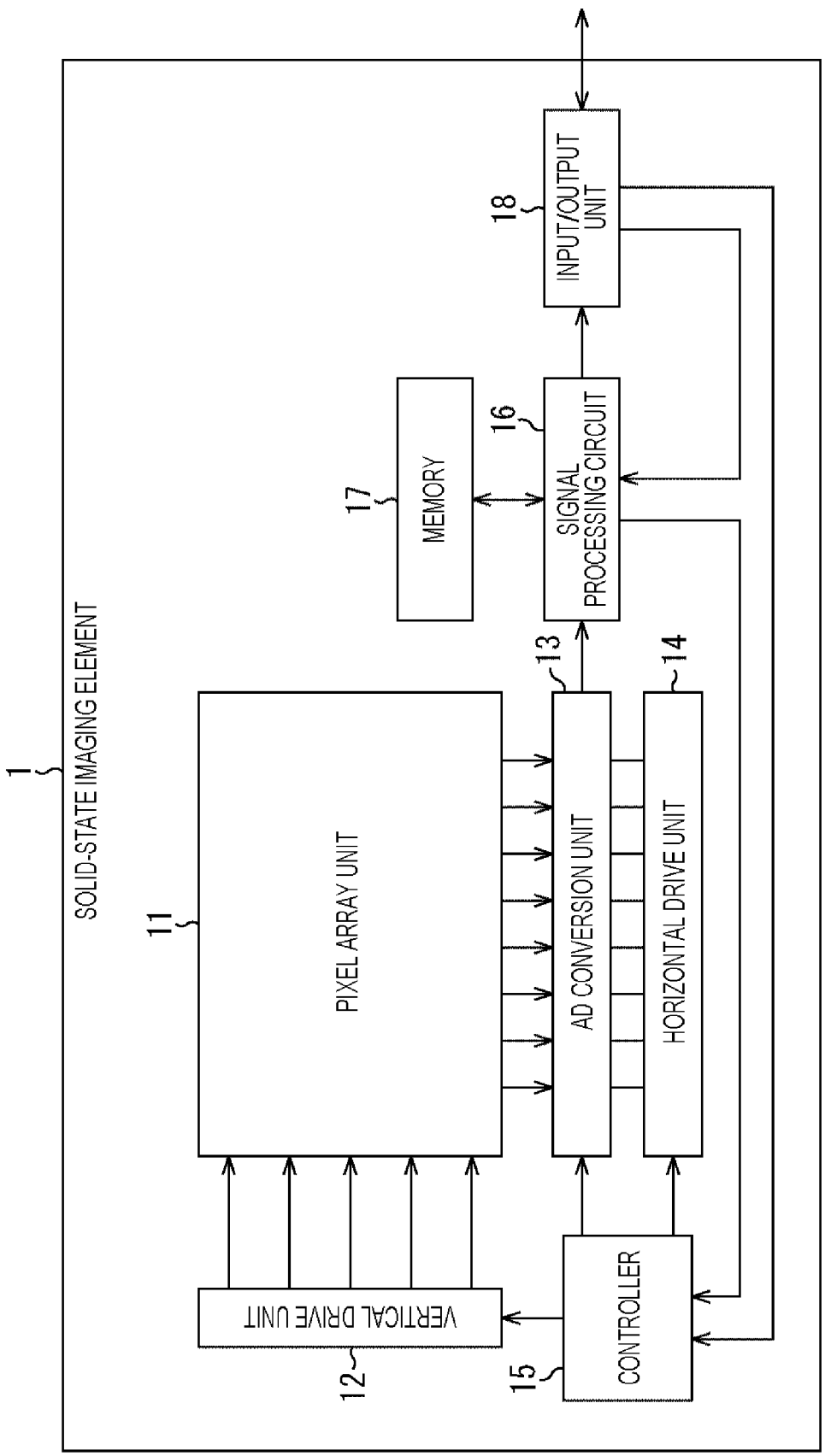
FIG. 1 is a diagram showing a schematic configuration of a solid-state imaging element to which the present technology is applied.

Hereinafter, a mode for carrying out the present technology (hereinafter referred to as an embodiment) will be described. Note that the description will be given in the following order.

1. Schematic configuration example of solid-state imaging element
2. Overview of convolutional neural network
3. First configuration example of signal processing circuit
4. Second configuration example of signal processing circuit
5. Modified examples
6. Filtering and addition processing on analog circuit
7. Configuration example of electronic device
8. Application examples

1. Schematic Configuration Example of Solid-State Imaging Element

FIG. 1 is a block diagram showing a schematic configuration of a solid-state imaging element according to the present disclosure.

The solid-state imaging element 1 of FIG. 1 includes a pixel array unit 11 in which a plurality of pixels (not shown) is arranged in a matrix and a peripheral circuit unit around it. The peripheral circuit unit includes a vertical drive unit 12, an AD conversion unit 13, a horizontal drive unit 14, a controller 15, a signal processing circuit 16, a memory 17, an input/output unit 18, and the like.

Each pixel two-dimensionally arranged in the pixel array unit 11 includes a photodiode as a photoelectric conversion unit and a plurality of pixel transistors. The plurality of pixel transistors is, for example, MOS transistors such as a transfer transistor, an amplification transistor, a selection transistor, and a reset transistor. For example, a Red, Green, or Blue color filter is arranged in a Bayer array in each pixel of the pixel array unit 11, and each pixel outputs a pixel signal of any one of Red, Green, or Blue. An example of a circuit configuration of the pixel will be described later with reference to FIG. 9.

The vertical drive unit 12 includes, for example, a shift register, and drives pixels for each row by supplying drive pulses to each pixel of the pixel array unit 11 via pixel drive wiring (not shown). In other words, the vertical drive unit 12 selectively and sequentially scans each pixel of the pixel array unit 11 for each row in a vertical direction, and supplies, to the AD conversion unit 13, a pixel signal based on signal charge generated according to an amount of incident light in the photodiode of each pixel through a vertical signal line (not shown) commonly provided for each column.

The AD conversion unit 13 performs correlated double sampling (CDS) processing for removing fixed pattern noise peculiar to a pixel and AD conversion processing for a pixel signal output from each pixel of one row of the pixel array unit 11.

The horizontal drive unit 14 includes, for example, a shift register, and sequentially outputs, to the signal processing circuit 16, a (digital) pixel signal after AD conversion of each pixel of a predetermined row held in the AD conversion unit 13 by sequentially outputting horizontal scanning pulses.

The controller 15 receives a clock signal and data for instructing an operation mode and the like input from the outside, and controls operation of the entire solid-state imaging element 1. For example, the controller 15 generates a vertical synchronizing signal, a horizontal synchronizing signal, and the like on the basis of the input clock signal, and supplies them to the vertical drive unit 12, the AD conversion unit 13, the horizontal drive unit 14, and the like.

The signal processing circuit 16 executes various digital signal processing such as black level adjustment processing, column variation correction processing, and demosaic processing on a pixel signal supplied from the AD conversion unit 13 as necessary, and supplies the pixel signal to the input/output unit 18. Depending on the operation mode, there is also a case where the signal processing circuit 16 performs only buffering and outputting. The memory 17 stores data such as parameters required for signal processing performed by the signal processing circuit 16. Furthermore, the memory 17 also includes, for example, a frame memory for storing an image signal in processing such as demosaic processing. The signal processing circuit 16 can cause the memory 17 to store parameters and the like input from an external image processing device via the input/output unit 18, and can appropriately select and execute signal processing on the basis of an instruction from the external image processing device.

The input/output unit 18 outputs image signals sequentially input from the signal processing circuit 16 to an external image processing device, for example, a subsequent image signal processor (ISP). Furthermore, the input/output unit 18 supplies signals and parameters input from the external image processing device to the signal processing circuit 16 and the controller 15.

The solid-state imaging element 1 is configured as described above, and is, for example, a CMOS image sensor called a column AD type that performs CDS processing and AD conversion processing for every pixel column.

2. Overview of Convolutional Neural Network

The solid-state imaging element 1 of FIG. 1 is configured so that it can perform a part of calculation processing of a convolutional neural network (hereinafter referred to as CNN) using an image generated by light reception (generated image) in the pixel array unit 11 and perform outputting to the outside.

First, an overview of the CNN will be described with reference to FIGS. 2 and 3.

Figure 2:
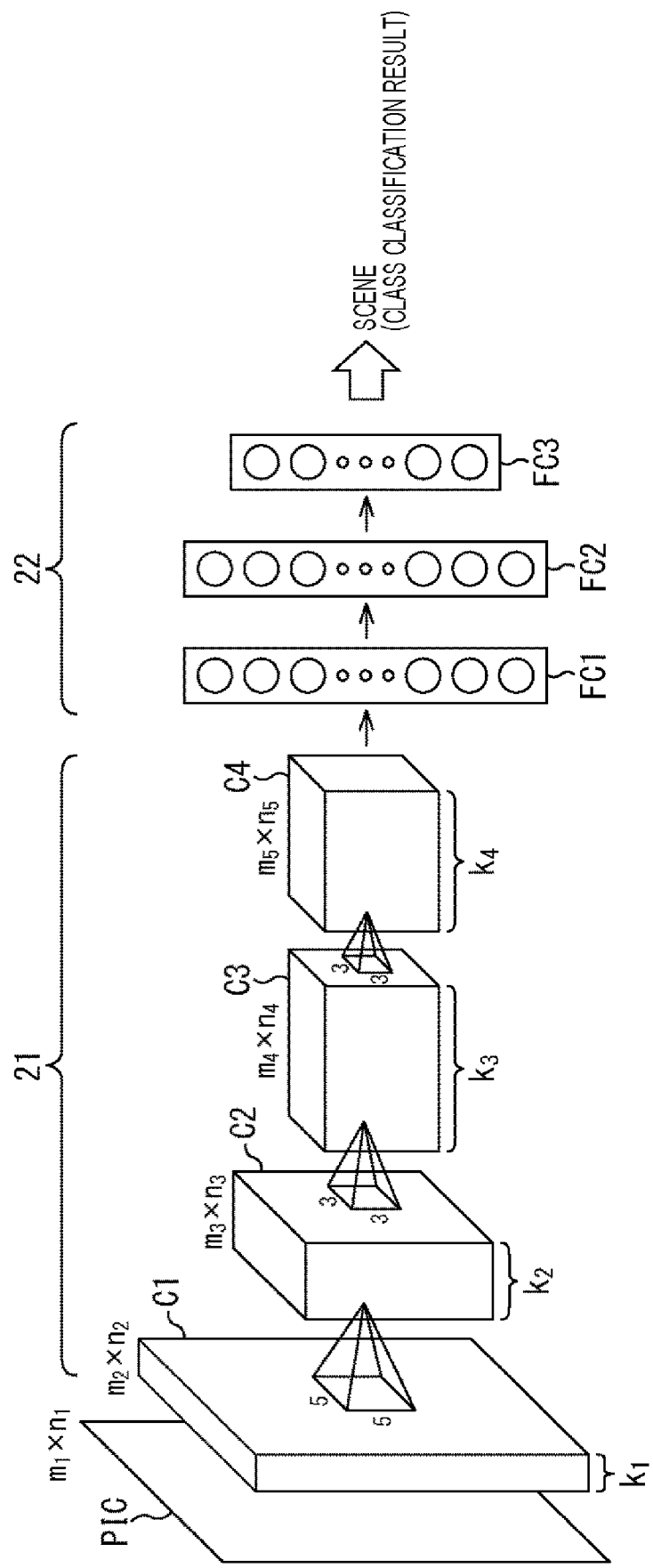
FIG. 2 is a diagram showing an example of a CNN configuration.

FIG. 2 is a diagram showing an example of a CNN configuration that outputs a class classification result from an input image.

For example, the CNN in FIG. 2 can perform, on an input image PIC, processing of outputting a scene to which the input image PIC corresponds as a class classification result from a plurality of scenes.

The CNN in FIG. 2 includes, for example, a feature amount extractor 21 including a plurality of stages of convolutional layers and pooling layers and a classifier 22 which is a neural network (fully connected layer). In the feature amount extractor 21 in a previous stage of the classifier 22, a feature of the input image is extracted by the convolutional layers and the pooling layers.

The feature amount extractor 21 in FIG. 2 includes four stages of convolutional layers and pooling layers. Assuming that a first-stage convolutional layer C1, a second-stage convolutional layer C2, a third-stage convolutional layer C3, and a fourth-stage convolutional layer C4 are used from a side closer to the input image PIC, resolution of processed images is smaller and the number of feature maps (number of channels) is larger in later stages. More specifically, assuming that resolution of the input image PIC is $m_1 \times n_1$, resolution of the first-stage convolutional layer C1 is $m_2 \times n_2$, resolution of the second-stage convolutional layer C2 is $m_3 \times n_3$, resolution of the third-stage convolutional layer C3 is $m_4 \times n_4$, and resolution of the fourth-stage convolutional layer C4 is $m_5 \times n_5$ ($m_1 \times n_1 < m_2 \times n_2 \leq m_3 \times n_3 \leq m_4 \times n_4 \leq m_5 \times n_5$). Furthermore, the number of feature maps of the first-stage convolutional layer C1 is $k_1$, the number of feature maps of the second-stage convolutional layer C2 is $k_2$, the number of feature maps of the third-stage convolutional layer C3 is $k_3$, and the number of feature maps of the fourth-stage convolutional layer C4 is $k_4$ ($k_1 \leq k_2 \leq k_3 \leq k_4$, but $k_1$ to $k_4$ are not the same). Note that illustration of the pooling layers is omitted in FIG. 2.

The classifier 22 includes an input layer FC1, one or more hidden layers FC2, and an output layer FC3, and all nodes of each layer are connected with all nodes of the subsequent layer.

The configuration of such a CNN is disclosed in, for example, "http://nocotan.github.io/chainer/2017/08/04/chainercnn-copy.html".

The CNN can be applied not only to class classification but also to a case of outputting image-like information such as image region division and heat map output.

Figure 3:
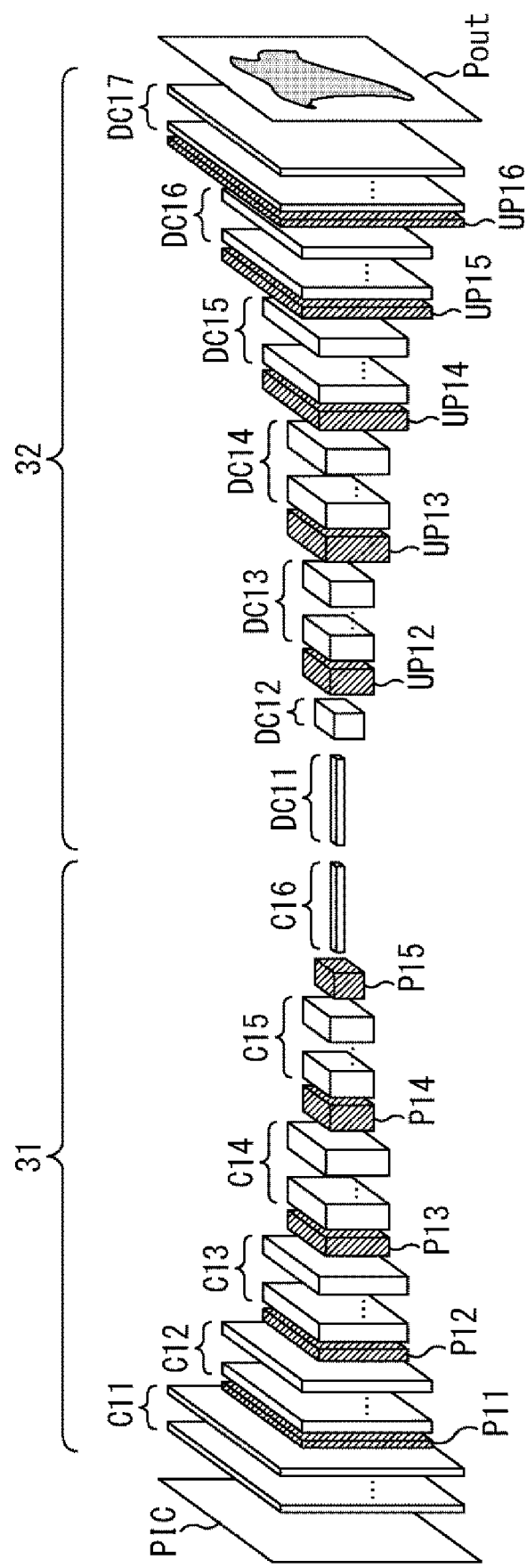
FIG. 3 is a diagram showing an example of a CNN configuration.

FIG. 3 is a diagram showing an example of a CNN configuration that outputs a region image identifying a region of a desired object included in an input image as an identification result.

For example, the CNN of FIG. 3 performs, on the input image PIC, processing of outputting an extracted image Pout that extracts a region of a desired object (for example, a person, an animal, a building, etc.) included in the input image PIC.

The CNN in FIG. 3 includes a convolutional network unit 31 and a deconvolutional network unit 32, and does not have a fully connected layer.

In the convolutional network unit 31, a first-stage convolutional layer C11 and a pooling layer P11 to a fifth-stage convolutional layer C15 and a poling layer P15, and a sixth-stage convolutional layer C16 are disposed in this order from a side closer to the input image PIC. In each convolutional layer, filtering processing by a predetermined filter coefficient and downsampling processing by a pooling layer are performed.

In the deconvolutional network unit 32, a first-stage deconvolutional layer DC11, a second-stage deconvolutional layer DC12 and an unpooling layer UP12 to a sixth-stage deconvolutional layer DC16 and an unpooling layer UP16, and a seventh-stage deconvolutional layer DC17 are disposed in this order from a side closer to the convolutional network unit 31. In each deconvolutional layer, filtering processing by a predetermined filter coefficient and upsampling processing by an unpooling layer are performed.

The configuration of such a CNN is disclosed, for example, in "https://www.wantedly.com/companies/xcompass/post_articles/72450".

In addition to the configurations described in FIGS. 2 and 3, various network configurations of the CNN can be considered depending on objects and purposes desired to be recognized by the CNN (for example, recognition of a scene being imaged, detection of positions and types of various objects, a face position, facial expression, posture, personal identification, etc.).

However, for the first-stage and second-stage layers close to the input image PIC, distribution of filter coefficients that extract primitive image feature amounts, which is close to contrast/edge detection and the like, is often obtained, and it is often possible to cover with a common filter coefficient and filter size.

Therefore, the solid-state imaging element 1 of FIG. 1 is configured so that calculation of the convolutional layer and the pooling layer on the side closer to the input image PIC which can be commonly used for various CNNs, for example, processing of the first-stage convolutional layer and the pooling layer, or processing of the first-stage and second-stage convolutional layers and the pooling layers, is executed in advance in the solid-state imaging element 1, and that a processed result can be output to the external image processing device. By executing a part of the CNN calculation in advance on a sensor of the solid-state imaging element 1, an image signal with resolution lower than resolution of the pixel array unit 11 can be output, so that it is possible to realize reduction of a bus band of a communication path with a subsequent device and suppression of power consumption.

3. First Configuration Example of Signal Processing Circuit

Figure 4:
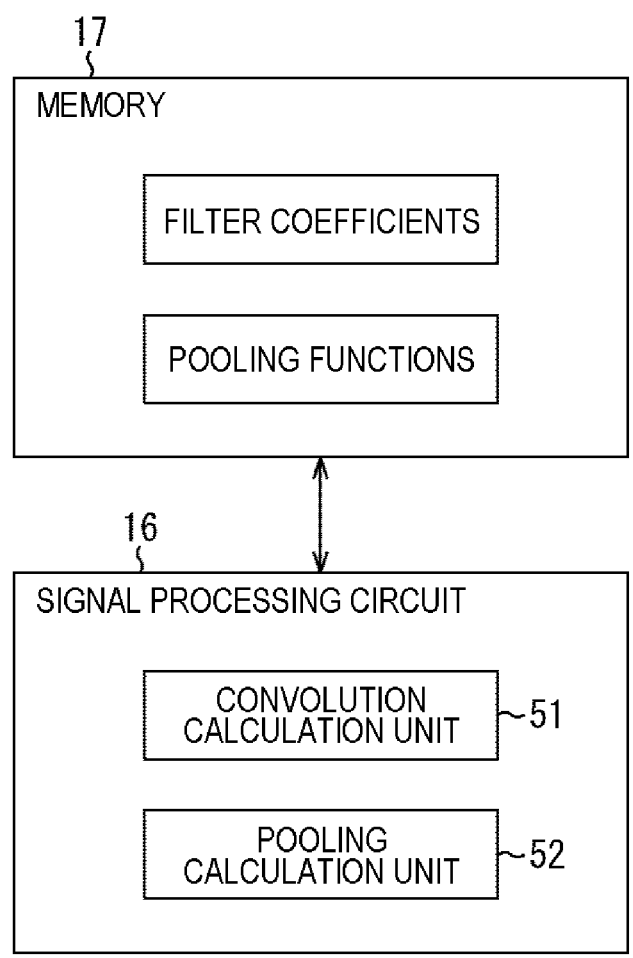
FIG. 4 is a block diagram showing a first configuration example of a signal processing circuit and a memory of the solid-state imaging element.

FIG. 4 is a block diagram showing a first configuration example of the signal processing circuit 16 and the memory 17 related to CNN calculation processing of the solid-state imaging element 1.

The signal processing circuit 16 includes a convolution calculation unit 51 and a pooling calculation unit 52, and functions as a calculation unit that performs a part of the calculation processing of the CNN.

The convolution calculation unit 51 performs convolution calculation processing of the CNN on a captured image supplied from the AD conversion unit 13, more specifically, on a pixel signal of each pixel of the pixel array unit 11. The pooling calculation unit 52 performs pooling calculation processing on the captured image after the convolution calculation.

The memory 17 stores filter coefficients used in the convolution calculation processing of the convolution calculation unit 51 and pooling functions used in the pooling calculation processing of the pooling calculation unit 52. For example, as the filter coefficients, filter coefficients having a filter size of 3×3 pixels and 32 types of filter types (the number of channels is 32) are stored. For the filter coefficients, coefficients learned from a large data set including a wide range of image features can be adopted. As the pooling functions, for example, functions for calculating a maximum value, an average value, a total value, etc. of 2×2 pixels are stored.

The convolution calculation unit 51 performs convolution calculation processing by using a filter coefficient stored in the memory 17. The pooling calculation unit 52 performs pooling calculation processing by using a pooling function stored in the memory 17. The frame memory, which is a part of the memory 17, stores data temporarily held in the convolution calculation processing and the pooling calculation processing.

Speaking of the example of the CNN in FIG. 2, for example, the signal processing circuit 16 processes the first-stage convolutional layer C1 and outputs a processed image. Speaking of the example of the CNN in FIG. 3, the signal processing circuit 16 processes the first-stage convolutional layer C11 and the pooling layer P11, and outputs a processed image. The input image PIC of FIGS. 2 and 3 corresponds to an image including pixel signals corresponding to an amount of light received by each pixel of the pixel array unit 11.

Note that the solid-state imaging element 1 can be configured to output not only the processed image of the first-stage convolutional layer and the pooling layer, but also a processed image of a plurality of stages closest to the input image PIC, for example, a processed image after processing the first-stage and second-stage convolutional layers and the pooling layers. In this case, first-stage and second-stage filter coefficients and pooling functions are stored in the memory 17. Furthermore, the memory 17 can store filter coefficients and pooling functions corresponding to a plurality of types of first-stage convolutional layers and pooling layers, and can select and calculate a predetermined filter coefficient and a pooling function specified by the external image processing device.

Figure 5:
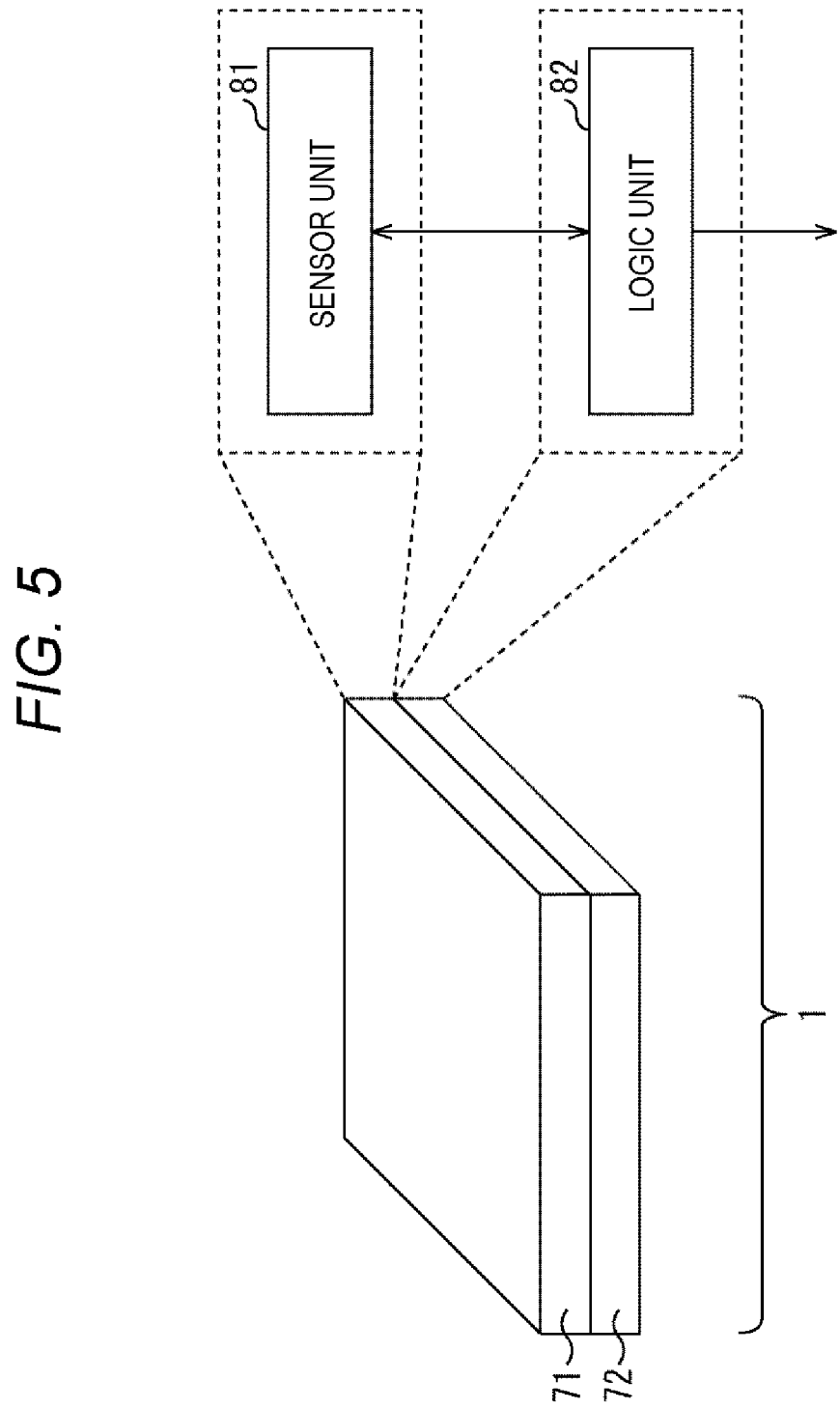
FIG. 5 is a diagram showing a chip configuration example of the solid-state imaging element.

As shown in FIG. 5, the solid-state imaging element 1 can be configured with one chip in which a sensor die (board) 71 as a plurality of dies (boards) and a logic die 72 are laminated.

The sensor die 71 is configured with a sensor unit 81 (as a circuit), and the logic die 72 is configured with a logic unit (as a circuit).

The sensor unit 81 includes at least the pixel array unit 11. The logic unit 82 includes, for example, the vertical drive unit 12, the AD conversion unit 13, the horizontal drive unit 14, the controller 15, the signal processing circuit 16, the memory 17, and the input/output unit 18. The input/output unit 18 included in the logic unit 82 outputs an image signal after executing processing corresponding to at least the first-stage convolutional layer and the pooling layer on the captured image (a signal after CNN processing) to the external image processing device.

Note that a shared configuration of the sensor unit 81 and the logic unit 82 is not limited to this, and any shared configuration can be used. For example, the vertical drive unit 12, the controller 15, and the like may be disposed in the sensor unit 81 instead of the logic unit 82.

Figure 6:
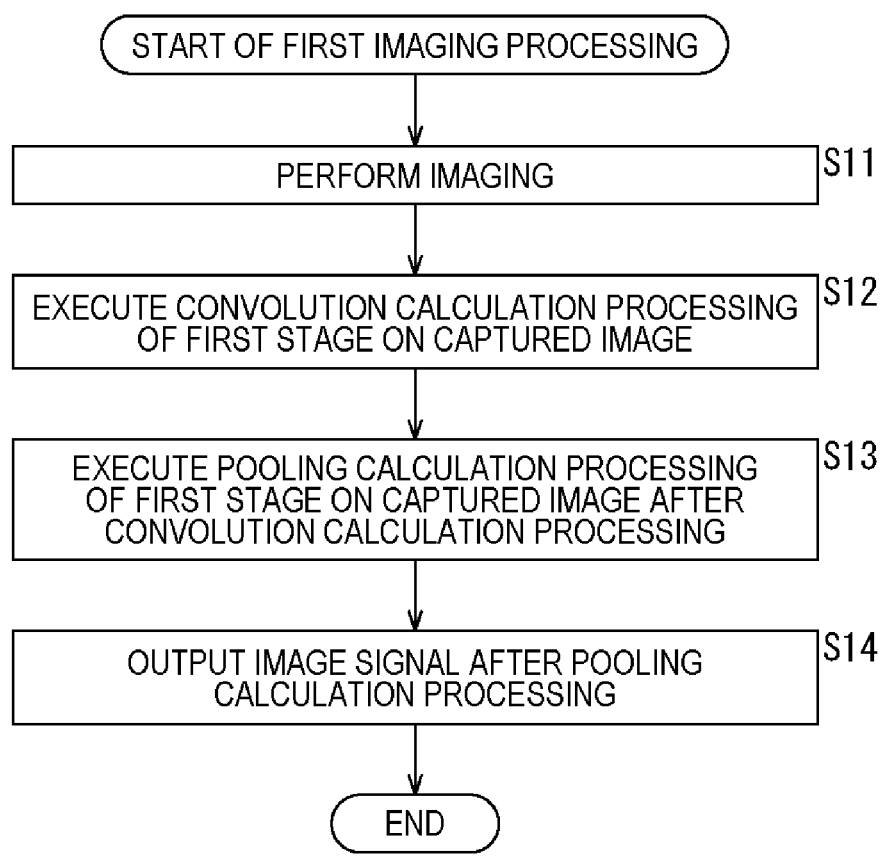
FIG. 6 is a flowchart illustrating first imaging processing of the solid-state imaging element.

Imaging processing (first imaging processing) of the solid-state imaging element 1 according to the first configuration example of the signal processing circuit will be described with reference to a flowchart of FIG. 6. The processing of FIG. 6 is started, for example, when a control signal instructing imaging is input from the external image processing device.

In step S11, the solid-state imaging element 1 performs imaging. In other words, the controller 15 supplies a clock signal and a control signal to the vertical drive unit 12 and the horizontal drive unit 14, and causes each pixel of the pixel array unit 11 to receive light for a predetermined exposure period. A pixel signal after receiving the light is input to the AD conversion unit 13, converted into a digital signal by the AD conversion unit 13, and then supplied to the signal processing circuit 16.

In step S12, the signal processing circuit 16 executes convolution calculation processing of a first stage of a CNN on a captured image obtained by the pixel array unit 11. Therefore, in the signal processing circuit 16, the pixel signal of each pixel of the pixel array unit 11 is multiplied by a filter coefficient read from the memory 17.

In step S13, the signal processing circuit 16 executes pooling calculation processing of the first stage of the CNN on the captured image after the convolution calculation processing. Therefore, in the signal processing circuit 16, a predetermined calculation is executed by substituting the pixel signal after the filter coefficient multiplication for a pooling function.

In step S14, the signal processing circuit 16 outputs the image signal of the captured image after the pooling calculation processing to the external image processing device via the input/output unit 18. Then, the imaging processing ends.

4. Second Configuration Example of Signal Processing Circuit

Figure 7:
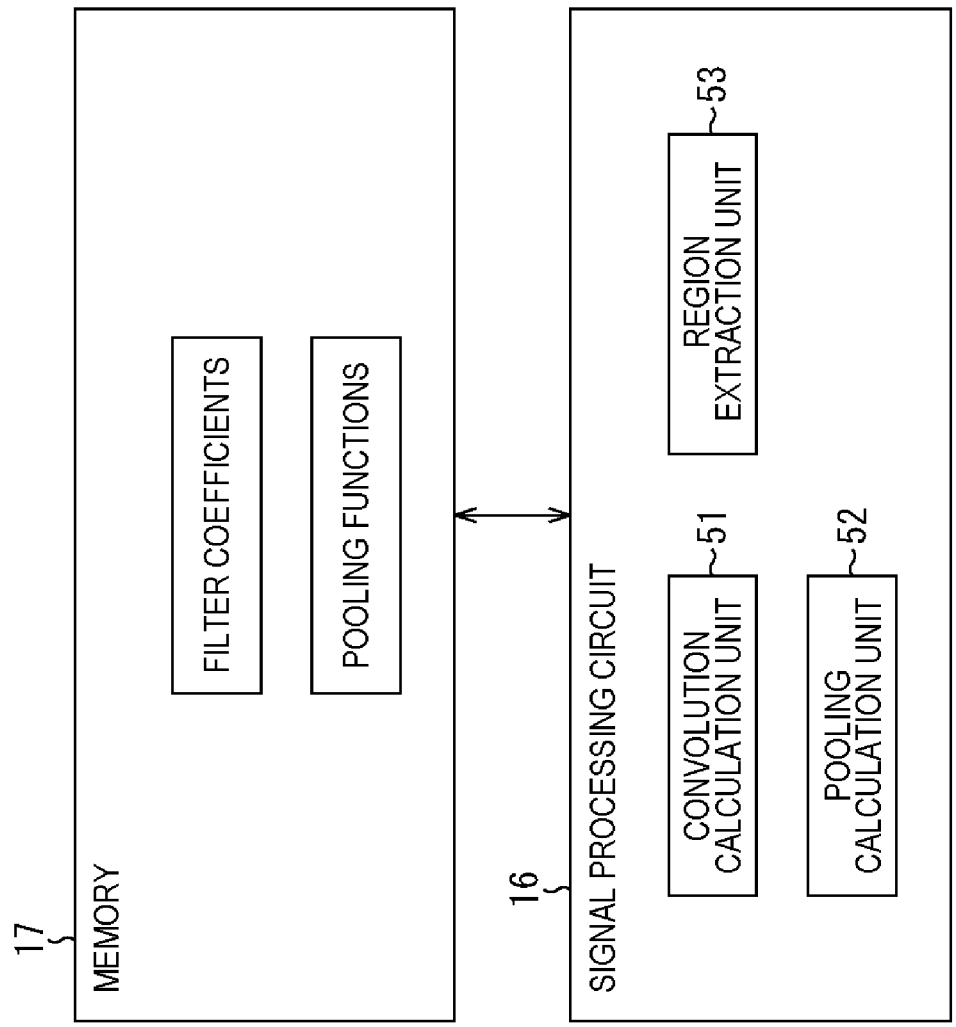
FIG. 7 is a block diagram showing a second configuration example of the signal processing circuit and the memory of the solid-state imaging element.

FIG. 7 is a block diagram showing a second configuration example of the signal processing circuit 16 and the memory 17 related to the CNN calculation processing of the solid-state imaging element 1.

In FIG. 7, parts corresponding to those in the first configuration example in FIG. 4 are designated by the same reference numerals, and description of the parts will be omitted.

The signal processing circuit 16 of FIG. 7 further includes a region extraction unit 53 in addition to the convolution calculation unit 51 and the pooling calculation unit 52, which are the same as those in the first configuration example.

The region extraction unit 53 extracts a region of an object to be focused on as a region of interest from a captured image supplied from the AD conversion unit 13. For example, the region extraction unit 53 detects a face region from the captured image and extracts it as the region of interest. Alternatively, the region extraction unit 53 extracts an object to be focused on from the captured image supplied from the AD conversion unit 13, and determines the region of interest so as to be a predetermined resolution region including the object. The region extraction unit 53 supplies region information for specifying the determined region of interest to the controller 15. In the next frame, the controller 15 controls the vertical drive unit 12 so as to image the region of interest on the basis of the region information from the region extraction unit 53.

The convolution calculation unit 51 uses a filter coefficient stored in the memory 17 to perform convolution calculation processing on the captured image in the region of interest. The pooling calculation unit 52 uses a pooling function stored in the memory 17 to perform pooling calculation processing on the captured image in the region of interest.

Figure 8:
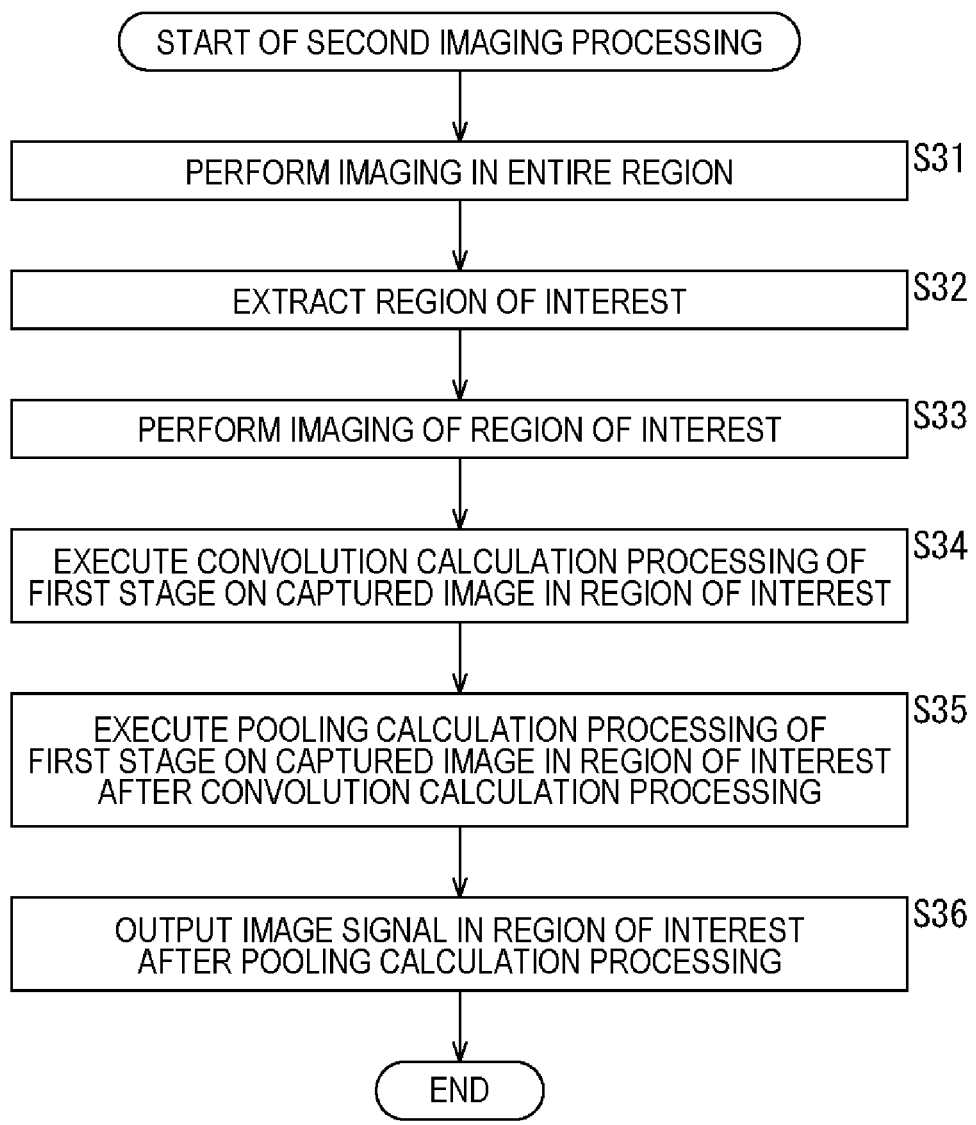
FIG. 8 is a flowchart illustrating second imaging processing of the solid-state imaging element.

Imaging processing (second imaging processing) of the solid-state imaging element 1 according to the second configuration example of the signal processing circuit will be described with reference to a flowchart of FIG. 8. The processing of FIG. 8 is started, for example, when a control signal instructing imaging is input from the external image processing device.

In step S31, the solid-state imaging element 1 performs imaging in an entire region of the pixel array unit 11. Processing of step S31 is similar to the processing of step S11 of FIG. 6.

In step S32, the region extraction unit 53 of the signal processing circuit 16 extracts a region of interest from a captured image supplied from the AD conversion unit 13. For example, the region extraction unit 53 extracts a region of an object to be focused on as the region of interest.

Alternatively, the region extraction unit 53 extracts an object to be focused on from the captured image supplied from the AD conversion unit 13, and determines the region of interest so as to be a predetermined resolution region including the object. The region extraction unit 53 supplies region information for specifying the determined region of interest to the controller 15.

In step S33, the controller 15 controls the vertical drive unit 12 to drive the pixel array unit 11 so as to image the region of interest on the basis of the region information from the region extraction unit 53. The pixel array unit 11 images the region of interest in the entire region of the pixel array unit 11. A pixel signal in the region of interest is converted into a digital signal by the AD conversion unit 13, and then supplied to the signal processing circuit 16.

In step S34, the signal processing circuit 16 executes convolution calculation processing of a first stage of the CNN on the captured image in the region of interest.

In step S35, the signal processing circuit 16 executes pooling calculation processing of the first stage of the CNN on the captured image in the region of interest after the convolution calculation processing.

In step S36, the signal processing circuit 16 outputs an image signal of the captured image in the region of interest after the pooling calculation processing to the external image processing device via the input/output unit 18. Then, the imaging processing ends.

5. Modified Examples

In the second imaging processing described above, the signal processing circuit 16 itself executes the processing of specifying the region of interest, but the region information for specifying the region of interest may be input from the external image processing device. In this case, the solid-state imaging element 1 outputs a captured image obtained by imaging in the entire area of the pixel array unit 11 to the external image processing device. Then, region information for specifying a region of interest is input from the external image processing device, and is supplied from the signal processing circuit 16 to the controller 15. Similarly, the signal processing circuit 16 performs calculation processing corresponding to the first-stage convolutional layer and the pooling layer of the CNN on the captured image in the region of interest.

In the second imaging processing described above, resolution information for specifying the predetermined resolution region including the object is determined in advance or stored in the memory 17, but the resolution information may be input from the external image processing device.

The signal processing circuit 16 may perform not only the calculation processing corresponding to the first-stage convolutional layer and the pooling layer of the CNN, but also calculation processing corresponding to a plurality of stages, including the second stage, of convolutional layers and pooling layers from a side closer to the captured image.

6. Filtering and Addition Processing on Analog Circuit

In the above-described embodiment, the convolution calculation processing of the first-stage convolutional layer of the CNN is performed in the signal processing circuit 16 by using the digital signal after the pixel signal has been AD-converted. However, the analog signal before being converted into the digital signal in the AD conversion unit 13 may be weighted corresponding to a filter coefficient. In this case, a circuit that performs signal processing of the analog signal functions as a calculation unit that performs a part of the calculation processing of the CNN.

Hereinafter, an example of a circuit configuration for weighting an analog pixel signal corresponding to a filter coefficient will be described.

Figure 9:
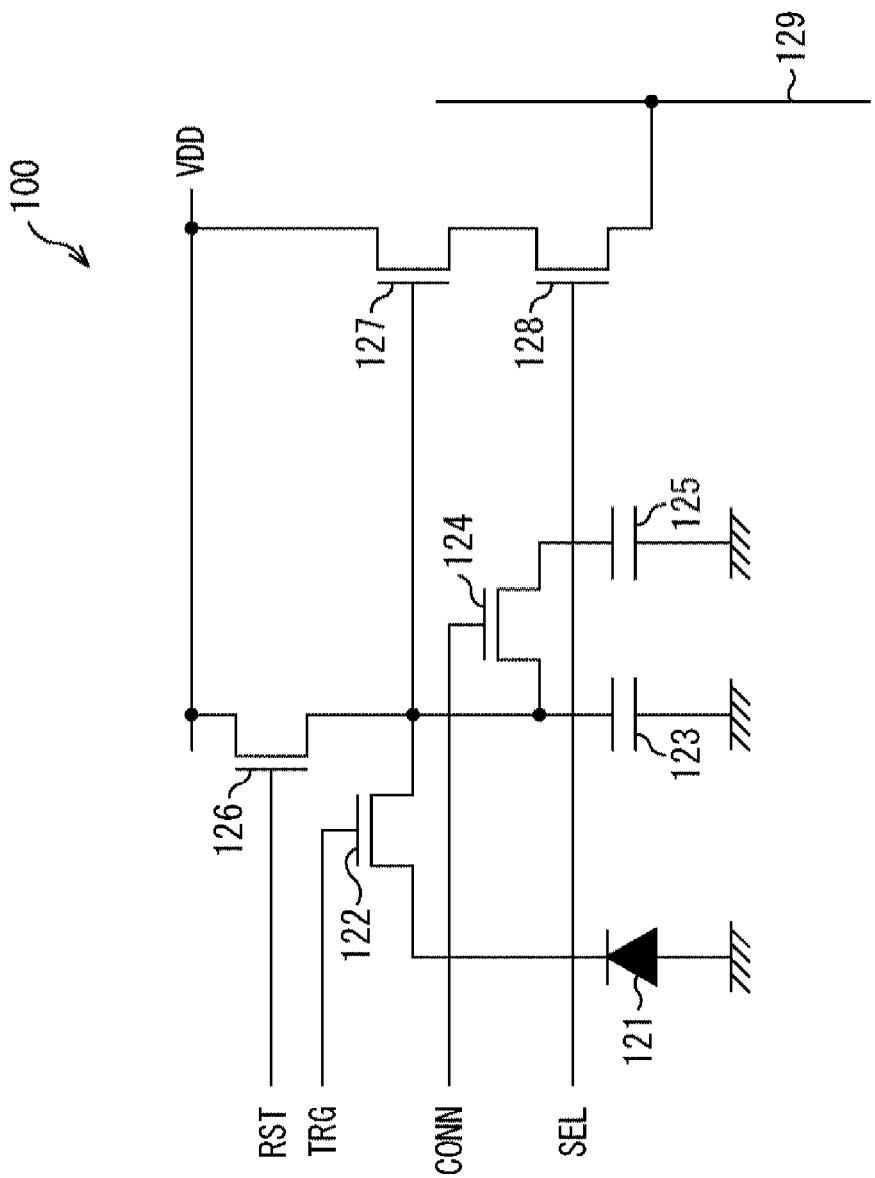
FIG. 9 is a diagram showing an example of a circuit configuration of a pixel arranged in a pixel array unit.

FIG. 9 is a diagram showing an example of a circuit configuration of a pixel arranged in the pixel array unit 11.

A pixel 100 in FIG. 9 includes a photoelectric conversion unit 121, a transfer transistor 122, a floating diffusion region (FD) 123, a connection transistor 124, an additional capacitor 125, a reset transistor 126, an amplification transistor 127, and a selection transistor 128.

The photoelectric conversion unit 121 includes, for example, a photodiode, receives incident light to perform photoelectric conversion, and stores charge obtained as a result. Furthermore, when a drive signal TRG supplied to a gate of the transfer transistor 122 becomes a high level and the transfer transistor 122 is turned on, the charge accumulated in the photoelectric conversion unit 121 is transferred to the FD 123 via the transfer transistor 122.

The FD 123 temporarily holds the charge transferred from the transfer transistor 122. The additional capacitor 125 is connected to the FD 123 via the connection transistor 124. When a drive signal CONN supplied to a gate of the connection transistor 124 becomes a high level and the connection transistor 124 is turned on, the FD 123 and the additional capacitor 125 are electrically connected. In this case, the charge transferred via the transfer transistor 122 is held by the FD 123 and the additional capacitor 125.

Furthermore, a vertical signal line 129 is connected to the FD 123 via the amplification transistor 127 and the selection transistor 128. The vertical signal line 129 is connected to a comparator 152 (FIG. 10) in the same column of the AD conversion unit 13 (FIG. 1).

When the reset transistor 126 is turned on by a reset signal RST, the charge held in the FD 123 is discharged to a constant voltage source VDD, so that potential of the FD 123 is reset. At a timing in which the reset transistor 126 is turned on, the connection transistor 124 is also turned on, and potential of the additional capacitor 125 is also reset at the same time.

The amplification transistor 127 outputs a pixel signal corresponding to the potential of the FD 123. In other words, the amplification transistor 127 constitutes a load MOS (not shown) as a constant current source and a source follower circuit, and a pixel signal indicating a level corresponding to the charge held in the FD 123 is output from the amplification transistor 127 to the AD conversion unit 13 (FIG. 1) via the selection transistor 128. The load MOS is provided in, for example, the AD conversion unit 13.

The selection transistor 128 is turned on when the pixel 100 is selected by a selection signal SEL, and outputs a pixel signal of the pixel 100 to the AD conversion unit 13 via the vertical signal line 129.

The pixel 100 configured as described above controls on/off of the connection transistor 124 and controls connection between the FD 123 and the additional capacitor 125, so that conversion efficiency of converting the accumulated charge (potential) of the FD 123 into a voltage signal can be changed. Therefore, weight of the pixel signal can be made different.

In other words, if the charge from the photoelectric conversion unit 121 is accumulated in the FD 123 and the additional capacitor 125 in a state in which the FD 123 and the additional capacitor 125 are electrically connected and a signal corresponding to the charge is read out, the efficiency of converting it into the voltage signal becomes lower.

On the contrary, if the charge from the photoelectric conversion unit 121 is accumulated in the FD 123 in a state in which the FD 123 is electrically separated from the additional capacitor 125 and a signal corresponding to the charge is read out, the efficiency of converting it into the voltage gas signal becomes higher.

For example, the FD 123 and the additional capacitor 125 are connected and conversion into a voltage signal is performed in a certain pixel 100 of the pixel array unit 11, and the FD 123 and the additional capacitor 125 are not connected and conversion into a voltage signal is performed in the other pixel 100. Therefore, weight of the pixel signal can be changed for each pixel. The weight of the pixel signal can be set by a capacity ratio of the FD 123 and the additional capacitor 125.

The solid-state imaging element 1 has, for example, a normal mode and an addition mode as operation modes. In the normal mode, the FD 123 and the additional capacitor 125 are not connected, weight of each pixel 100 is equally set, and imaging is performed. On the other hand, in the addition mode, the FD 123 and the additional capacitor 125 are connected at a predetermined pixel 100, the weight of each pixel 100 is made different, and imaging is performed by the solid-state imaging element 1.

Note that the pixel circuit of FIG. 9 is a pixel circuit of a rolling shutter system. However, a charge holding unit (memory unit) that holds charge transferred by the transfer transistor 122 and a second transfer transistor that transfers the charge of the charge holding unit to the FD 123 may be further provided between the transfer transistor 122 and the FD 123 to enable drive of a global shutter system.

Figure 10:
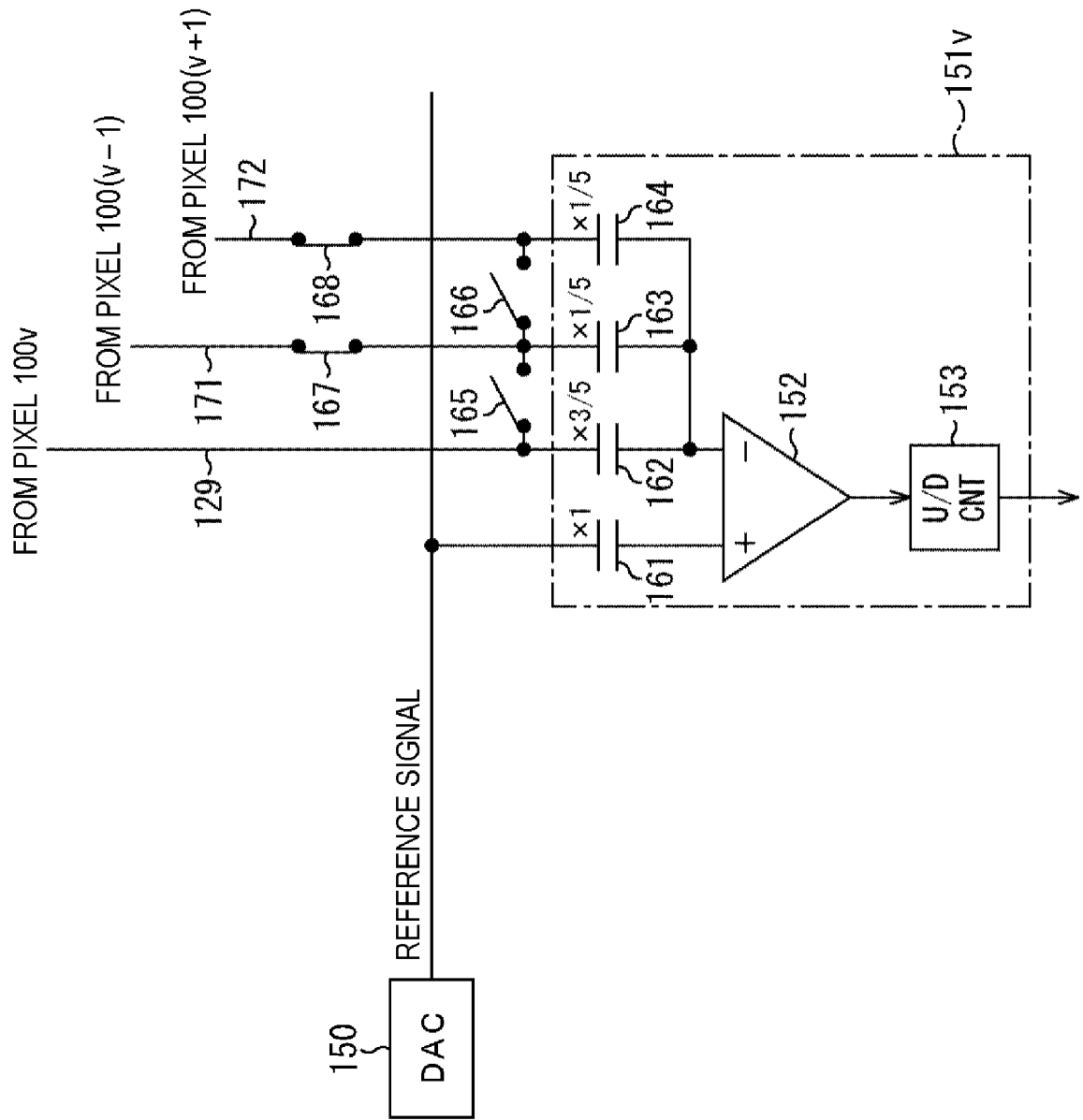
FIG. 10 is a diagram schematically showing a detailed configuration of an AD conversion unit.

FIG. 10 is a diagram schematically showing a detailed configuration of the AD conversion unit 13.

The AD conversion unit 13 includes a column ADC 151 for each pixel column of the pixel array unit 11. A column ADC 151ν in FIG. 10 is a column ADC 151 corresponding to a pixel 100ν in a predetermined v-th column among the pixels 100 arranged in a row direction in the pixel array unit 11.

The column ADC 151ν of FIG. 10 includes the comparator 152, a counter (U/D CNT) 153, and four capacitive elements 161 to 164.

The comparator 152 outputs a difference signal obtained by comparing a pixel signal and a reference signal supplied from a DAC 150 to the counter 153. For example, in a case where the reference signal is larger than the pixel signal, a Hi (High) difference signal is supplied to the counter 153, and in a case where the reference signal is smaller than the pixel signal, a Lo (Low) difference signal is supplied to the counter 153.

The counter 153 counts down only while the Hi difference signal is supplied during a P phase (Reset Phase) AD enable period, and counts up only while the Hi difference signal is supplied during a D phase (Data Phase) AD enable period. The P phase AD enable period is a period for measuring a reset component ΔV which is a variation component of a pixel, and the D phase AD enable period is a period for measuring (signal component Vsig+reset component ΔV). When a count in the P phase AD enable period and a count in the D phase AD enable period are combined, only the signal component Vsig can be obtained by (signal component Vsig+reset component ΔV)−(reset component ΔV), and CDS processing is realized.

The capacitive elements 161 to 164 are for removing a DC component of the reference signal and the pixel signal. A capacity of the capacitive element 162 is ⅗ of that of the capacitive element 161 and a capacity of each of the capacitive elements 163 and 164 is ⅕ of that of the capacitive element 161. Therefore, a combined capacity of the capacitive elements 162 to 164 is equivalent to the capacity of the capacitive element 161.

One end point of the capacitive element 161 is connected with the digital to analog converter (DAC) 150, and another end point thereof is connected with the comparator 152. One end point of the capacitive element 162 is connected with the comparator 152, and another end point of the capacitive element 162 is connected with the pixel 100ν via the vertical signal line 129.

Furthermore, one end point of the capacitive element 163 is connected with the comparator 152, and another end point of the capacitive element 163 is connected with a vertical signal line 129 (not shown) of a pixel 100(v−1) adjacent to the pixel 100ν in the row direction via a switch 167 and connection wiring 171. One end point of the capacitive element 164 is connected with the comparator 152, and another end point of the capacitive element 164 is connected with a vertical signal line 129 (not shown) of a pixel 100(v+1) adjacent to the pixel 100ν on a side opposite to the pixel 100(v−1) via a switch 168 and connection wiring 172.

Moreover, the end points of the capacitive elements 162 and 163 on a side opposite to the comparator 152 side are connected to each other via a switch 165, and the end points of the capacitive elements 163 and 164 on a side opposite to the comparator 152 side are connected to each other via a switch 166.

In the normal mode, the controller 15 turns on both the switches 165 and 166 and turns off both the switches 167 and 168. In this case, the comparator 152 compares the reference signal supplied from the DAC 150 and the pixel signal of the pixel 100ν, and outputs a difference signal obtained as a result. In other words, in the normal mode, an analog pixel signal is AD-converted at the same ratio for each pixel column.

On the other hand, in the pixel addition mode, the controller 15 turns off both the switches 165 and 166 and turns on both the switches 167 and 168. In this case, the comparator 152 compares the reference signal supplied from the DAC 150 and an added pixel signal obtained by adding the three pixel signals of the pixels 100(v−1), 100ν, and 100(v+1), and supplies a difference signal obtained as a result to the counter 153.

Since a capacity ratio of the capacitive elements 162 to 164 is 3:1:1, the column ADC 151ν outputs pixel data obtained by adding the pixel signals of the three pixels 100(v−1), 100ν, and 100(v+1) adjacent in the row direction at a ratio of 1:3:1.

As described above, by providing the plurality of capacitive elements for the pixel signal originally provided for removing the DC component under the condition that the combined capacity is the same as the capacity of the capacitive element for removing the DC component of the reference signal, it is possible to realize processing of adding the pixel signals of the plurality of pixels adjacent to each other in the row direction at a predetermined ratio.

Either one of the configurations in FIGS. 9 and 10 may be adopted, or both may be adopted at the same time. Note that the configurations in FIGS. 9 and 10 are merely examples. The capacity ratio setting and the number of pixels to be added can be appropriately set according to the filter coefficient of the convolutional layer, and the capacity ratio corresponding to the filter coefficient can be set to be changeable by switching the connections. Furthermore, the calculation of the analog signal as shown in the configurations of FIGS. 9 and 10 is performed as calculation corresponding to the first-stage convolutional layer and the pooling layer, and calculation corresponding to the second-stage convolutional layer and the pooling layer may be performed in the signal processing circuit 16.

7. Configuration Example of Electronic Device

The present technology is not limited to application to the solid-state imaging element. In other words, the present technology can be applied to, for example, all electronic devices such as smartphones, tablet terminals, mobile phones, personal computers, game machines, television receivers, wearable terminals, digital still cameras, and digital video cameras. The solid-state imaging element may be formed as one chip, or may be a modular form having an imaging function in which an imaging unit and a signal processing unit or an optical system are packaged together.

Figure 11:
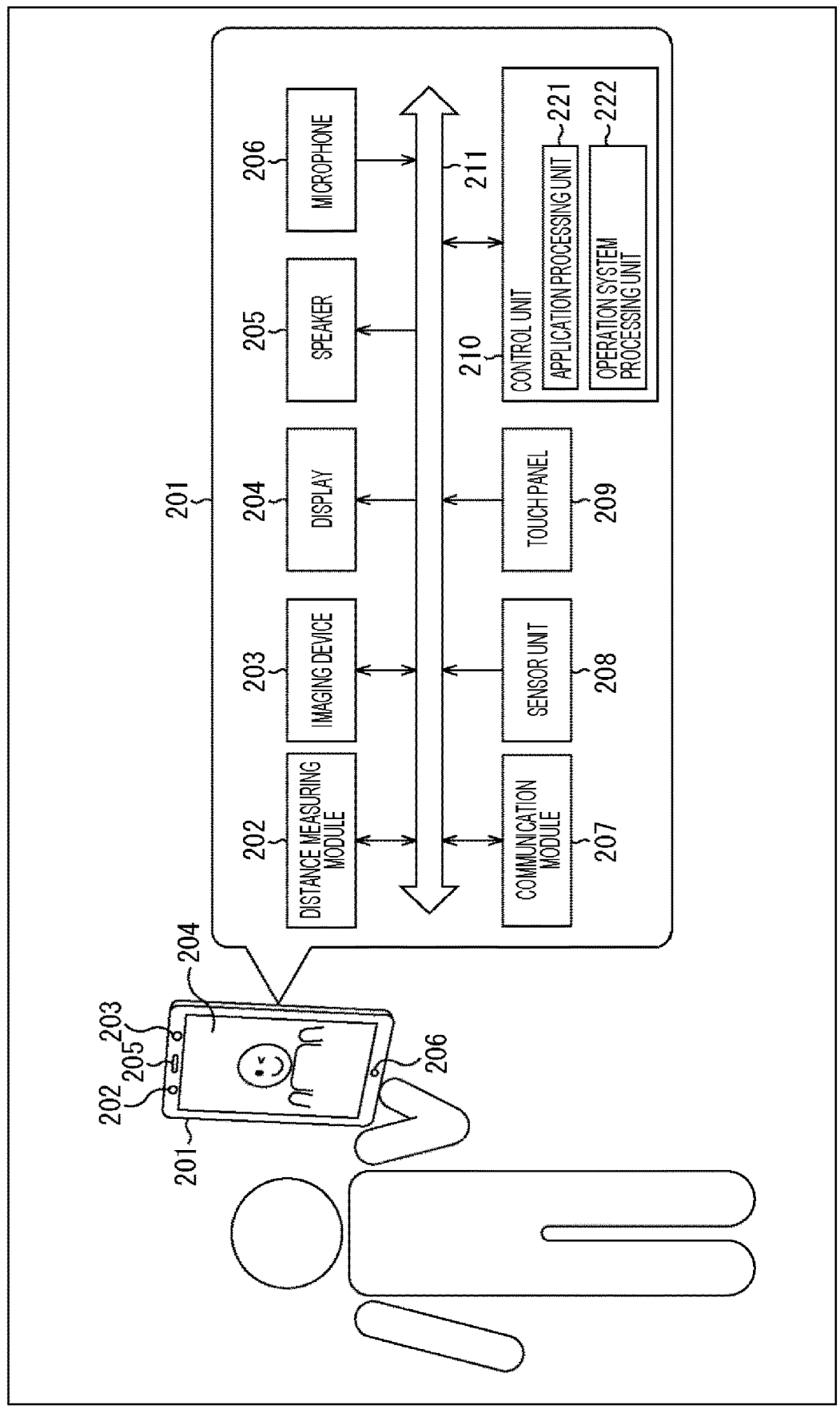
FIG. 11 is a block diagram showing a configuration example of a smartphone as an electronic device to which the present technology is applied.

FIG. 11 is a block diagram showing a configuration example of a smartphone as an electronic device to which the present technology is applied.

As shown in FIG. 11, a smartphone 201 is configured by connecting a distance measuring module 202, an imaging device 203, a display 204, a speaker 205, a microphone 206, a communication module 207, a sensor unit 208, a touch panel 209, and a control unit 210 via a bus 211. Furthermore, the control unit 210 has functions as an application processing unit 221 and an operation system processing unit 222 by executing a program by a CPU.

The distance measuring module 202 is disposed on a front surface of the smartphone 201, and measures a distance to a subject in front and outputs it as a distance measurement result. For example, by performing distance measurement for a user of the smartphone 201, the distance measuring module 202 can output depth of a surface shape of the user's face, hand, finger, etc. as the distance measurement result.

The imaging device 203 is disposed on the front surface of the smartphone 201, and images a subject in front and outputs an image obtained as a result. For example, by imaging a user of the smartphone 201 as the subject, an image showing the user is generated. Note that, although not shown, the imaging device 203 may be disposed on a back surface of the smartphone 201. The solid-state imaging element 1 described above is mounted as an image sensor of the imaging device 203.

The display 204 displays an operation screen for performing processing by the application processing unit 221 and the operation system processing unit 222, an image captured by the imaging device 203, and the like. The speaker 205 and the microphone 206, for example, output voice of the other party and collect voice of a user at the time of making a call by the smartphone 201.

The communication module 207 performs network communication such as Bluetooth (registered trademark) and wireless LAN. The sensor unit 208 senses speed, acceleration, proximity, etc., and the touch panel 209 acquires a touch operation by a user on the operation screen displayed on the display 204.

The application processing unit 221 performs processing for providing various services by the smartphone 201. For example, the application processing unit 221 can perform processing of creating an image in which a facial expression of a user is processed or filtered on the basis of a captured image supplied from the imaging device 203 and of displaying the image on the display 204. Furthermore, the application processing unit 221 can perform processing of creating, for example, three-dimensional shape data of an arbitrary three-dimensional object on the basis of depth supplied from the distance measuring module 202.

The operation system processing unit 222 performs processing for realizing basic functions and operations of the smartphone 201. For example, the operation system processing unit 222 can perform processing of authenticating a user's face and unlocking the smartphone 201 on the basis of depth supplied from the distance measuring module 202. Furthermore, the operation system processing unit 222 can perform, for example, processing of recognizing user's gesture on the basis of depth supplied from the distance measuring module 202, and perform processing of inputting various operations according to the gesture.

As described above, the smartphone 201 in which the solid-state imaging element 1 described above is incorporated as a part of the imaging device 203 can be realized.

8. Application Examples

In the smartphone 201 configured in this way, one application program as the application processing unit 221 executed by the CPU acquires, from the imaging device 203, an image after being executed up to calculation processing corresponding to a first-stage convolutional layer and a pooling layer of a CNN, and executes remaining calculation processing of the CNN. Therefore, a predetermined service can be provided.

Figure 12:
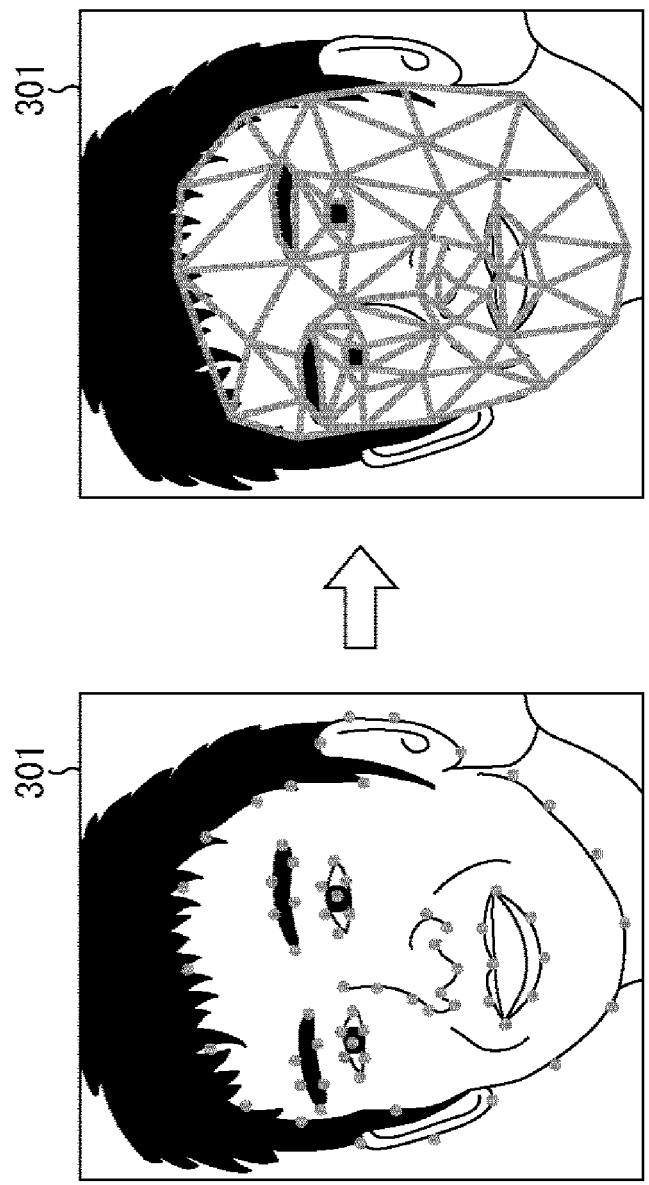
FIG. 12 is a diagram illustrating an application example of the smartphone.
Figure 13:
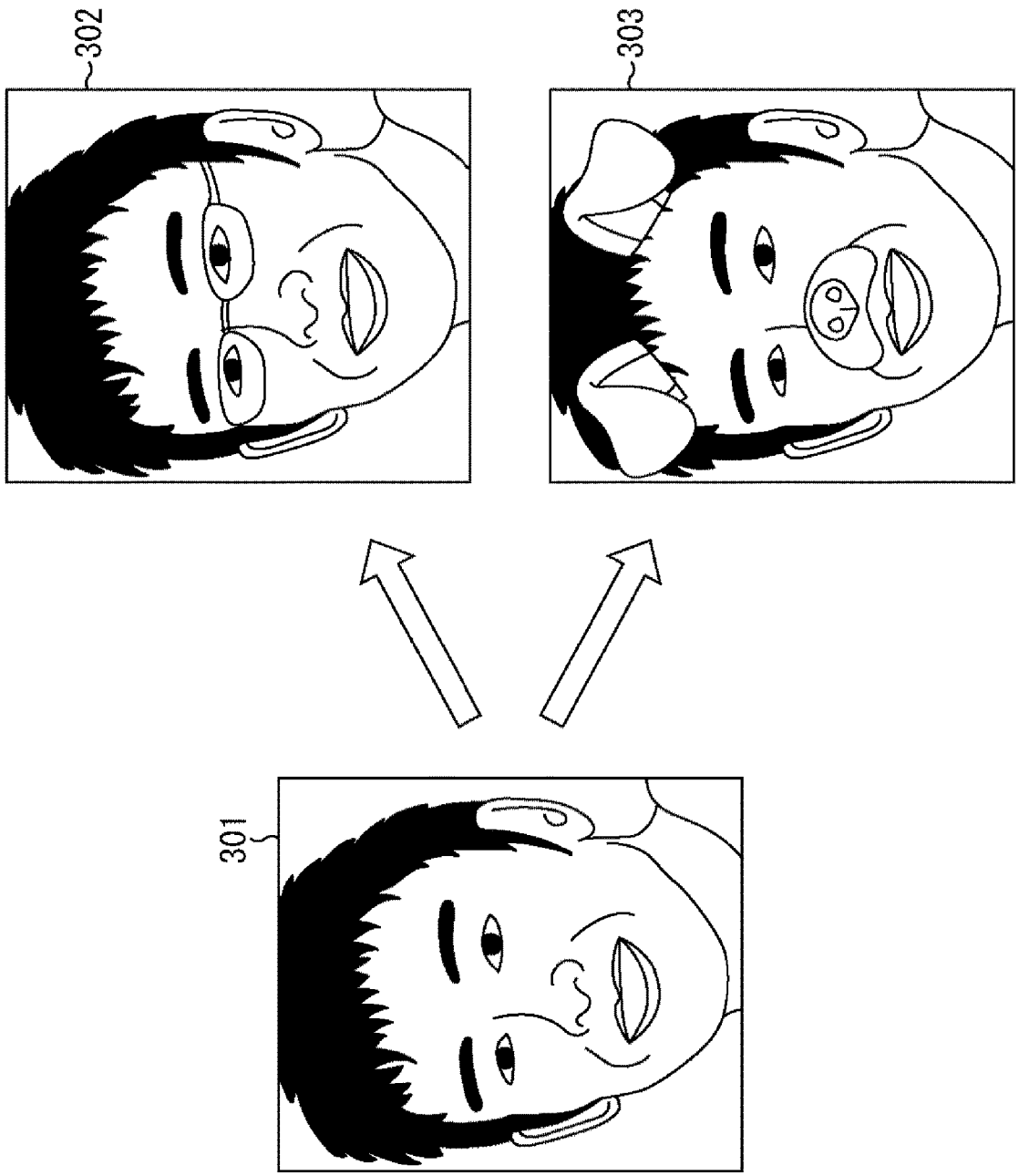
FIG. 13 is a diagram illustrating an application example of the smartphone.

FIGS. 12 and 13 show processing examples of an application program that acquires an image after calculation processing of the CNN from the imaging device 203 and processes the image (hereinafter, referred to as an image processing application).

The image processing application acquires an image from the imaging device 203, recognizes an image scene from a plurality of scenes, for example, a night view, a person, a backlight, a landscape, and the like, and switches a processing mode of image processing.

Furthermore, as shown in FIG. 12, the image processing application executes processing of extracting feature points of an image 301 of a face region included in the image from the imaging device 203, and specifies a position of each part such as eyes, a nose, a mouth, and ears. In the image 301 of the face region on the left side of FIG. 12, points indicated by dots (circles) represent the extracted feature points.

Then, as shown in FIG. 13, the image processing application causes the display 204 to display a processed image in which a predetermined image is superimposed on a predetermined part of the image 301 of the face region. An image 302 is an example of a processed image in which glasses are superimposed on a user's face. An image 303 is an example of a processed image in which parts imitating animal ears and nose are superimposed on the user's face.

The CNN is used for the image scene recognition processing and the feature point extraction processing as shown in FIG. 12. The image processing application acquires an image signal after the calculation processing corresponding to the first-stage convolutional layer and the pooling layer commonly set for the CNN of the scene recognition processing and the feature point extraction processing from the imaging device 203, and then performs calculation of a subsequent-stage convolutional layer and a pooling layer and calculation of a fully connected layer. Then, the image processing application causes the display 204 to display a finally obtained processed image. Since the image processing application can acquire image data after executing a part of the calculation processing of the CNN from the imaging device 203, a bus band and a processing load can be reduced.

Alternatively, for example, in a case where a plurality of filter coefficients and pooling functions is stored in the memory 17 of the solid-state imaging element 1, the calculation of the first-stage convolutional layer and the pooling layer can also be made different for the scene recognition processing and the feature point extraction processing. In this case, the image processing application specifies types of the filter coefficient and the pooling function to the solid-state imaging element 1 via the input/output unit 18, and an image signal obtained by performing different calculations of the first-stage convolutional layer and the pooling layer for the CNN of the scene recognition processing and the CNN of the feature point extraction processing is acquired from the solid-state imaging element 1.

An embodiment of the present technology is not limited to the above-described embodiment, and various modifications can be made without departing from the scope of the present technology.

For example, in the above-described embodiment, it has been described that the solid-state imaging element 1 is configured to perform demosaic processing of a pixel signal of any of Red, Green, or Blue obtained from each pixel, thereby converting the pixel signal into an image in which each pixel has pixel information of Red, Green, and Blue and outputting it.

However, the present technology can be applied to all solid-state imaging elements (light receiving elements) each including a pixel array unit having a plurality of pixels arranged two-dimensionally. For example, it can also be applied to a grayscale output solid-state imaging element that does not have a color filter, a solid-state imaging element that receives infrared rays, and a solid-state imaging element as a ToF sensor that receives reflected light reflected from a subject and outputs depth information according to a distance to the subject, and the like.

The effects described in the present specification are merely examples and are not limited, and there may be other effects.

Note that the present technology can have the following configurations.

(1)

A solid-state imaging element including:
a calculation unit that performs calculation of at least one stage of a convolutional layer and a pooling layer in a convolutional neural network on a signal corresponding to a light reception amount of light incident on each pixel of a pixel array unit.

(2)

The solid-state imaging element according to (1) above, further including:
a memory that stores a coefficient corresponding to the calculation of the convolutional layer and the pooling layer, in which
the calculation unit performs the calculation by performing processing of multiplying the signal of the pixel by the coefficient.

(3)

The solid-state imaging element according to (2) above, in which
the memory stores a plurality of types of the coefficients, and
the calculation unit selects one of the plurality of types of coefficients and performs the calculation.

(4)

The solid-state imaging element according to any one of (1) to (3) above, in which
the calculation unit multiplies the signal of the pixel by the coefficient corresponding to the calculation of the convolutional layer by making a capacity ratio of a capacitive element that holds the signal different for each pixel.

(5)

The solid-state imaging element according to any one of (1) to (4) above, further including:
an output unit that outputs a pixel signal having resolution lower than resolution corresponding to the number of pixels of the pixel array unit by the calculation of at least one stage of the convolutional layer and the pooling layer.

(6)

The solid-state imaging element according to any one of (1) to (5) above, in which
the calculation unit extracts a region of interest from an image obtained by the pixel array unit, and performs the calculation on the image in the region of interest.

(7)

A signal processing method of a solid-state imaging element, the method including:
by the solid-state imaging element,
performing calculation of at least one stage of a convolutional layer and a pooling layer in a convolutional neural network on a signal corresponding to a light reception amount of light incident on each pixel of a pixel array unit, and outputting a pixel signal after the calculation.

(8)

An electronic device including:
a solid-state imaging element including a calculation unit that performs calculation of at least one stage of a convolutional layer and a pooling layer in a convolutional neural network on a signal corresponding to a light reception amount of light incident on each pixel of a pixel array unit.

REFERENCE SIGNS LIST

1 Solid-state imaging element
11 Pixel array unit
13 AD conversion unit
15 Controller
16 Signal processing circuit
17 Memory
18 Input/output unit
100 Pixel
121 Photoelectric conversion unit
122 Transfer transistor
123 FD
125 Additional capacitor
152 Comparator
161 to 164 Capacitive element
201 Smartphone
221 Application processing unit
204 Display

The invention claimed is:

1. A solid-state imaging element, comprising:
a calculation unit configured to:
execute a calculation, of at least one stage of a convolutional layer and a pooling layer in a convolutional neural network, on a signal corresponding to a light reception amount of light incident on each pixel of a pixel array unit;
change, based on a coefficient corresponding to the calculation of the convolutional layer, a capacity ratio of a capacitive element configured to hold the signal different for each pixel of the pixel array unit; and
multiply the signal by the coefficient corresponding to the calculation of the convolutional layer based on the changed capacity ratio of the capacitive element.

2. The solid-state imaging element according to claim 1, further comprising:
a memory configured to store the coefficient corresponding to the calculation of the convolutional layer and the pooling layer, wherein
the calculation unit is further configured to execute the calculation of at least one stage of a convolutional layer and a pooling layer based on the multiplication of the signal of each pixel of the pixel array unit by the coefficient.

3. The solid-state imaging element according to claim 2, wherein
the memory is further configured to store a plurality of types of the coefficient, and the calculation unit is further configured to select one of the plurality of types of the coefficient for the calculation.

4. The solid-state imaging element according to claim 1, further comprising:
an output unit configured to output, based on the calculation of at least one stage of the convolutional layer and the pooling layer, a pixel signal that has a resolution lower than a resolution corresponding to a number of pixels of the pixel array unit.

5. The solid-state imaging element according to claim 1, further comprises the pixel array unit configured to capture an image, wherein
the calculation unit is further configured to:
extract a region of interest from the captured image, and
execute the calculation on the image in the region of interest.

6. A signal processing method, comprising:
executing a calculation, by a solid-state imaging element, of at least one stage of a convolutional layer and a pooling layer in a convolutional neural network, on a signal corresponding to a light reception amount of light incident on each pixel of a pixel array unit;
changing, by the solid-state imaging element, based on a coefficient corresponding to the calculation of the convolutional layer, a capacity ratio of a capacitive element configured to hold the signal different for each pixel of the pixel array unit; and
multiplying, by the solid-state imaging element, the signal by the coefficient corresponding to the calculation of the convolutional layer based on the changed capacity ratio of the capacitive element; and
outputting, by the solid-state imaging element, a pixel signal based on the calculation.

7. An electronic device, comprising:
a solid-state imaging element including:
a calculation unit configured to:
execute a calculation, of at least one stage of a convolutional layer and a pooling layer in a convolutional neural network, on a signal corresponding to a light reception amount of light incident on each pixel of a pixel array unit;
change, based on a coefficient corresponding to the calculation of the convolutional layer, a capacity ratio of a capacitive element configured to hold the signal different for each pixel of the pixel array unit; and
multiply the signal by the coefficient corresponding to the calculation of the convolutional layer based on the changed capacity ratio of the capacitive element.

* * * * *